Figure 1:
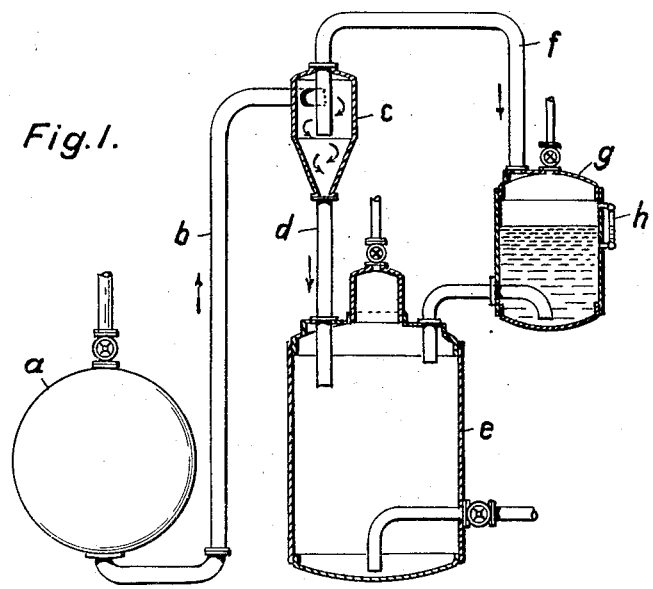

April 18, 1933.  A. SOMMERMEYER  1,904,556

DECOMPOSITION AND SEPARATION APPARATUS

Original Filed May 9, 1929

Inventor:

A. Sommermeyer

UNITED STATES PATENT OFFICE

AUGUST SOMMERMEYER, OF BERLIN-RUDOW, GERMANY

DECOMPOSITION AND SEPARATION APPARATUS

Application filed May 9, 1929, Serial No. 361,749, and in Germany September 24, 1926. Renewed March 31, 1931.

I have filed application in Germany September 24, 1926.

This invention relates to an apparatus for the treatment of organic material such as animal carcases, and the like, for the purpose of decomposing such material with steam and the subsequent separation of the liquid and solid decomposed constituents in a separate vessel, all under pressure.

The invention in its preferred embodiment includes a novel means in the connecting conduit from the vessel in which the decomposition takes place to the separating vessel, whereby the transfer of the material is continuously automatic, and comprises a vapor draw-off connection in said conduit whereby a difference of pressure in the two vessels is created which causes or allows the decomposed material to be forced out of the decomposition vessel into the separation vessel.

For the treatment of the decomposition products of animal carcases, slaughterhouse refuse and the like and also of similar mixtures of solid and liquid substances, apparatus is known wherein the solid and liquid products are led off together from a decomposition apparatus and are conducted to a separation vessel. As is well known various zones form in the separation vessel corresponding to the different specific gravities of the constituents of the decomposed material so that it is possible to provide in a simple manner for the desired separate recovery of the individual constituents of the decomposed material. Thus the pasty or pulpy material collecting in the lower part of the separation vessel is conveyed to the drying apparatus either immediately, or after passing through a second separation vessel.

Such known devices operating on the Hartmann and Sommermeyer principle as discussed above have a very considerable overall constructional height, as the separation vessel following the decomposition vessel is disposed immediately below the latter. Such a device is disclosed in U. S. Patent 1,046,402. The reason for this is that gravity alone is relied upon for conveying the decomposed products into the separation vessel. A down-fall pipe constitutes the connection between the said vessels which are maintained under the same pressure by a pressure compensating tube. The large overall height is very disadvantageous, more particularly because there is frequently only a limited amount of space available for such apparatus. This is the case for example in ships in which the treatment of whales is carried on.

The present invention obviates the said defect by arranging the separation vessel following the decomposition vessel alongside the latter. The whole apparatus is, as a result, more compact and may easily be accommodated on one floor. Apart from the advantage of requiring less space, the arrangement according to the invention has the further advantage of being more readily supervised. The conveyance of the decomposed material from the decomposition vessel into the separation vessel is advantageously effected with the aid of the vapour or steam pressure obtaining in said decomposition vessel. Other means of conveyance, for instance mechanical means, might, however, be employed. A further feature of the invention resides in the improvement of the apparatus by the provision in the up-rising pipe connection between the decomposition and separation vessels and above the latter of an enlargement into which dips a pipe intended for carrying off hot vapours and so forth and leading them to a condensing vessel. The decomposed products thus pass into the separation vessel without admixtures of steam or vapour. The vessel for condensing or depositing the latter communicates with the separation vessel by a pipe connection or by dipping into the same.

The apparatus of this invention is concerned not with the Podewils system but with the Hartmann and Sommermeyer system.

The processes of these two systems are fundamentally different from each other. Whereas in the Podewils process the drum is used not only for the extraction or decomposition but also for the drying, according to the Hartman-Sommermeyer system the treatment of animal carcases comprises the decomposition of the material in a decomposition vessel proper and the drying and separation in a separate arrangement. While in the Podewils process, the fatty liquor is removed by itself from the drum, according to the other process the solid and liquid products are conducted away together from the decomposition apparatus and are led to the separation vessel.

Two embodiments of the invention are illustrated by way of example in the accompanying drawing in which:—

Figure 2:
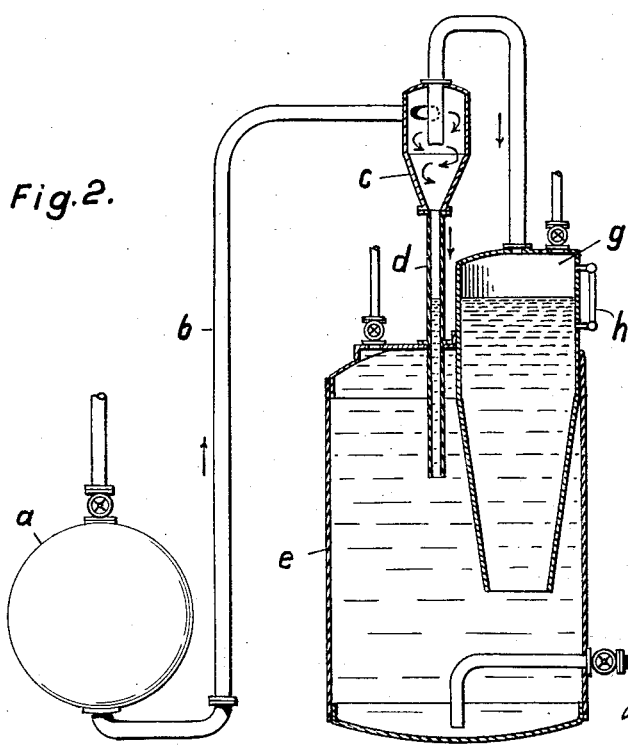

Figure 1 is a diagrammatic illustration of one embodiment wherein the vessel for receiving or condensing hot vapours communicates with the separation vessel by a pipe connection and Figure 2 is a similar illustration of the second embodiment wherein the said vessel dips into the separation vessel.

Referring more particularly to Figure 1, $a$ indicates the decomposition vessel or extractor in which the raw material is decomposed by means of steam under pressure. The examples illustrated show a decomposition vessel of the type wherein the decomposed products are removed continuously from the apparatus unseparated. The decomposition vessel $a$ communicates with the separation vessel $e$ through an up-rising pipe $b$ discharging into a down-fall pipe $d$ provided with an enlargement $c$. As will be evident from the drawing the separation vessel is arranged immediately beside the decomposition vessel. A pipe $f$ leading to a collecting and condensing vessel $g$ dips into the enlargement $c$; the vessel $g$ is connected, also by a pipe, with the separation vessel $e$. A level indicator $h$ is arranged on the vessel $g$. The remaining provisions, more particularly the inlet and outlet devices, are indicated diagrammatically only. How those parts of the apparatus which follow the separation vessel $e$ are arranged is immaterial for the purposes of the present invention because no difficulty will be encountered with the known apparatus, about arranging the remaining parts thereof side by side without exceeding the requisite overall height.

The apparatus illustrated operates in the following manner: The vessels $a$ and $e$ are both under superatmospheric pressure during the steam treatment of the organic material in the vessel $a$. While the material is decomposing, a vapor pressure develops in the top of vessel $a$ and the pasty mass formed is forced out of the bottom through the pipe $b$, through the enlarged portion $c$ to the separation vessel $e$. In the enlarged portion $c$ hot vapours and steam separate from the pasty mass and pass through the pipe $f$ to the condensing vessel $g$. The condensation causes a reduction in pressure in the enlargement $c$ and vessel $e$, whereby flow of the pasty mass is effected.

The individual constituents settle in known manner in the separation vessel $e$ into different zones and are conducted to apparatus not illustrated for further treatment. The course of operations may be supervised with the aid of the level-indicator $h$.

The apparatus illustrated in Figure 2 differs from that in Figure 1 only insofar as the vessel $g$ does not communicate with the separation vessel by a pipe connection but by the dipping of the vessel $g$ into the separation vessel $e$.

I claim:—

1. Apparatus adapted for the vapor treatment of organic material such as animal carcases and the like under pressure, comprising, in combination, a decomposition vessel, a separation vessel on substantially the same level as said decomposition vessel, a pipe connecting said vessels for conducting the decomposed material, said pipe communicating with the decomposition vessel adjacent the bottom thereof, an enlarged portion in said pipe, a vapor draw-off pipe extending into said enlarged portion and connected to a vapor collecting vessel.

2. An apparatus for the vapor treatment of organic material such as animal carcases and the like under pressure, comprising, in combination, a decomposition vessel, a separation vessel, on substantially the same level as said decomposition vessel, a pipe connecting said vessels for conducting the decomposed material, said pipe communicating with the decomposition vessel adjacent the bottom thereof, an enlarged portion in said pipe, a collecting and condensing vessel, a vapor draw-off pipe extending into said enlarged portion of said pipe and connected to said collecting and condensing vessel, a pipe connecting said collecting and condensing vessel to said separation vessel, whereby condensed vapor may be led back to said separation vessel.

3. An apparatus for the vapor treatment of organic material such as animal carcases and the like under pressure, comprising, in combination, a decomposition vessel, a separation vessel, on substantially the same level as said decomposition vessel, a pipe connecting said vessels, said pipe communicating with the decomposition vessel adjacent the bottom thereof, an enlarged portion in said pipe, a collecting and condensing vessel extending into said separation vessel and opening into the interior thereof, and a vapor draw-off conduit extending into said enlarged portion of said pipe and connected to said collecting and condensing vessel.

4. An apparatus of the character described, comprising, in combination, a decomposition vessel adapted for the treatment of material under pressure, a separation vessel on substantially the same level as said decomposition vessel, a pipe connected to the bottom of said decomposition vessel, and to the top of said separation vessel, an enlarged portion in said pipe, a collecting and condensing vessel communicatively connected into said separating vessel, and a vapor draw-off pipe extending into said enlarged portion of said pipe and connected to said collecting and condensing vessel.

5. Apparatus for the treatment of organic material such as animal carcases and the like, comprising, in combination, a decomposition vessel, means for introducing steam thereinto, a separation vessel, on substantially the same level as said decomposition vessel, a pipe connecting said vessels for conducting the decomposed material, said pipe communicating with the decomposition vessel adjacent the bottom thereof, a vapor separator in said pipe, and condensing apparatus connected with said vapor separator, said condensing apparatus forming with said separation vessel a closed system, whereby pressure differential in said vessels causes the decomposed material to pass from said decomposition vessel to said separation vessel.

6. Apparatus for the treatment of organic material yielding mixtures of solid and liquid products on vapor treatment, comprising, in combination, a decomposition vessel adapted for the treatment of such material under vapor pressure, a separation vessel, a pipe connecting said vessels adapted for the conveying of decomposed material from said decomposition vessel to said separation vessel, said pipe communicating with the decomposition vessel adjacent the bottom thereof, and means for producing a pressure differential in said vessels causing the decomposed material to pass from said decomposition vessel to said separation vessel, said means comprising a condensing apparatus for vapor and means connecting said condensing apparatus and said separation vessel to form a closed system.

7. Apparatus for the treatment of organic material yielding mixtures of solid and liquid products on vapor treatment, comprising, in combination, a decomposition vessel adapted for the treatment of such material under vapor pressure, a separation vessel on substantially the same level as said decomposition vessel, a pipe connecting said vessels adapted for the conveying of decomposed material from said decomposition vessel to said separation vessel, said pipe communicating with the decomposition vessel adjacent the bottom thereof, and means for producing a pressure differential in said vessels causing the decomposed material to pass from said decomposition vessel to said separation vessel, said means comprising a condensing apparatus for vapor and means connecting said condensing apparatus and said separation vessel to form a closed system.

AUGUST SOMMERMEYER.